United States Patent
Ohmori (10) Patent No.: US 11,018,353 B2
(45) Date of Patent: May 25, 2021

(54) FUEL CELL SEPARATOR MEMBER AND FUEL CELL STACK

(71) Applicant: HONDA MOTOR CO., LTD., Tokyo (JP)

(72) Inventor: Suguru Ohmori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 16/381,103

(22) Filed: Apr. 11, 2019

(65) Prior Publication Data

US 2019/0319280 A1    Oct. 17, 2019

(30) Foreign Application Priority Data

Apr. 17, 2018   (JP) .............................. JP2018-078998

(51) Int. Cl.
| | |
|---|---|
| *H01M 8/0276* | (2016.01) |
| *H01M 8/0247* | (2016.01) |
| *H01M 8/2475* | (2016.01) |
| *H01M 8/2404* | (2016.01) |
| *H01M 8/1018* | (2016.01) |

(52) U.S. Cl.
CPC ....... *H01M 8/0276* (2013.01); *H01M 8/0247* (2013.01); *H01M 8/2404* (2016.02); *H01M 8/2475* (2013.01); *H01M 2008/1095* (2013.01); *H01M 2250/20* (2013.01)

(58) Field of Classification Search
CPC ............. H01M 8/0202; H01M 8/0276; H01M 8/0247; H01M 8/2475; H01M 8/2404; H01M 2250/20; H01M 2008/1095; H01M 8/0273; H01M 8/247; Y02E 60/50
See application file for complete search history.

(56) References Cited

U.S. PATENT DOCUMENTS

| | | | | |
|---|---|---|---|---|
| 2003/0068523 A1* | 4/2003 | Kaneta | ................ | H01M 8/0202 |
| | | | | 428/670 |
| 2007/0082251 A1* | 4/2007 | Inagaki | ............... | H01M 8/0258 |
| | | | | 429/457 |
| 2016/0072145 A1* | 3/2016 | Martinchek | ......... | H01M 8/2404 |
| | | | | 429/457 |
| 2017/0324099 A1* | 11/2017 | Stoehr | ................ | H01M 8/0276 |
| 2019/0341631 A1* | 11/2019 | Haase | ................ | H01M 8/0276 |

* cited by examiner

*Primary Examiner* — Magali P Slawski
*Assistant Examiner* — Soraya Jasmyn Johnson
(74) *Attorney, Agent, or Firm* — Amin, Turocy & Watson, LLP

(57) ABSTRACT

A first separator constituting a separator member of a fuel cell stack is provided with a first rib that protrudes from the first separator at a portion between a first seal line and a load receiving portion toward a second separator located on the opposite side across an MEA and that extends in a line along the extending direction of the first seal line. An opening is formed in at least one end of the first rib in the extending direction thereof.

13 Claims, 6 Drawing Sheets

FUEL CELL SEPARATOR MEMBER AND FUEL CELL STACK

CROSS-REFERENCE TO RELATED APPLICATION

This application is based upon and claims the benefit of priority from Japanese Patent Application No. 2018-078998 filed on Apr. 17, 2018, the contents of which are incorporated herein by reference.

BACKGROUND OF THE INVENTION

Field of the Invention

The present invention relates to a fuel cell separator member and a fuel cell stack including a separator as a component of a unit cell of the fuel cell stack.

Description of the Related Art

A solid polymer electrolyte fuel cell, for example, includes unit cells (power generating cells) in each of which a membrane electrode assembly (MEA), formed from an anode and a cathode disposed on the opposite sides of an electrolyte membrane made of a polymer ion exchange membrane, is held between two separators. Each separator has a reactant gas flow field in which reactant gas is supplied along the power generating surface of the membrane electrode assembly and a sealing portion surrounding the reactant gas flow field to prevent leakage of the reactant gas.

Unit cells are typically stacked as many as required and tightened together for use as an in-vehicle fuel cell stack, for example. Accordingly, the sealing surface of the sealing portion is pressed against the outer peripheral portion of the MEA or a frame provided on the MEA by the tightening load on the fuel cell stack. That is, a certain bearing pressure acts on the sealing surface of the sealing portion.

This type of fuel cell stack can also be subjected to an external impact load. In such a situation, the unit cells tend to move in a direction orthogonal to the stacking direction (a direction in which the tightening load is not applied).

For instance, U.S. Patent Application Publication No. 2016/0072145 proposes a fuel cell stack that can suppress such movement. The separator of this fuel cell stack has a plate-shaped load receiving portion protruding outwardly from the outer peripheral portion of the separator. When an external impact load is applied to the fuel cell stack, the load receiving portion comes into contact with a projection protruding inwardly from the inner surface of a stack case. This suppresses movement of the unit cells in the direction orthogonal to the stacking direction.

SUMMARY OF THE INVENTION

A portion of the separator that supports the load receiving portion (a supporting portion) should have an increased rigidity. In a case where a rib is formed so as to protrude from the separator at a portion between the sealing portion and the load receiving portion toward the opposite separator located on the opposite side across the MEA for the purpose of increasing the rigidity of the supporting portion, the protruding end surface of the rib contacts the opposite separator (the protruding end surface of the rib formed on the opposite separator).

The rib ends in the extending direction thereof are hard to bend because of relatively high rigidity. Thus, the tightening load of the fuel cell stack acts on the rib ends, and the bearing pressure acting on the sealing portion at spots near the rib ends in the extending direction can become relatively small (the bearing pressure can be lost). Consequently, the bearing pressure acting on the sealing portion can vary.

The present invention was made in view of this challenge and an object thereof is to provide a fuel cell separator member and a fuel cell stack that can increase the rigidity of the supporting portion of a separator in which a load receiving portion is provided and that can reduce variations in the bearing pressure that acts on a sealing portion of the separator.

To attain the object, a fuel cell separator member according to the present invention includes a separator forming a unit cell of a fuel cell stack and a plate-shaped load receiving portion provided on the separator so as to protrude outwardly from an outer peripheral portion of the separator, the unit cell including an opposite separator located on an opposite side of the separator across a membrane electrode assembly, wherein the separator includes: a sealing portion provided around the outer peripheral portion of the separator and making close contact with the membrane electrode assembly to prevent leakage of fluid from between the membrane electrode assembly and the separator; and a rib protruding from the separator at a portion between the sealing portion and the load receiving portion toward the opposite separator and extending in a line along an extending direction of the sealing portion, and an opening is formed in at least one end of the rib in an extending direction thereof.

Preferably, in the fuel cell separator member, the sealing portion extends in a wavy shape in a plan view of the separator, and each end of the rib in the extending direction thereof is located opposite a concave curved portion of the sealing portion, the concave curved portion being curved such that it is recessed with respect to an outer edge of the separator.

Preferably, in the fuel cell separator member, a protruding length of the rib is same as a length of the sealing portion along a thickness direction of the separator.

Preferably, in the fuel cell separator member, the separator includes a reinforcing rib extending from the rib in a direction that crosses the extending direction of the rib.

A fuel cell stack according to the present invention is characterized in that it includes a plurality of stacked unit cells each having the fuel cell separator member set forth above.

Preferably, in the fuel cell stack, the unit cell includes a joined separator made of a first separator as the separator and a second separator joined together, and the load receiving portion is not provided on the second separator.

The present invention can increase the rigidity of the supporting portion of the separator in which the load receiving portion is provided, because the rib protrudes from the separator at a portion between the sealing portion and the load receiving portion.

In addition, due to the formation of the opening in at least one end of the rib in the extending direction thereof, the rigidity at the rib ends in the extending direction thereof can be reasonably reduced. This allows the rib ends in the extending direction thereof to effectively bend when the fuel cell separator member is incorporated into the fuel cell stack and a tightening load is applied in the stacking direction. Thus, reduction in the pressure (bearing pressure) acting the sealing portion at spots near the rib ends in the extending direction thereof can be suppressed. Accordingly, variations in the bearing pressure acting on the sealing portion of the separator can be reduced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The fuel cell separator member and fuel cell stack according to the present invention are described below by showing preferred embodiments and with reference to the accompanying drawings.

Figure 1:
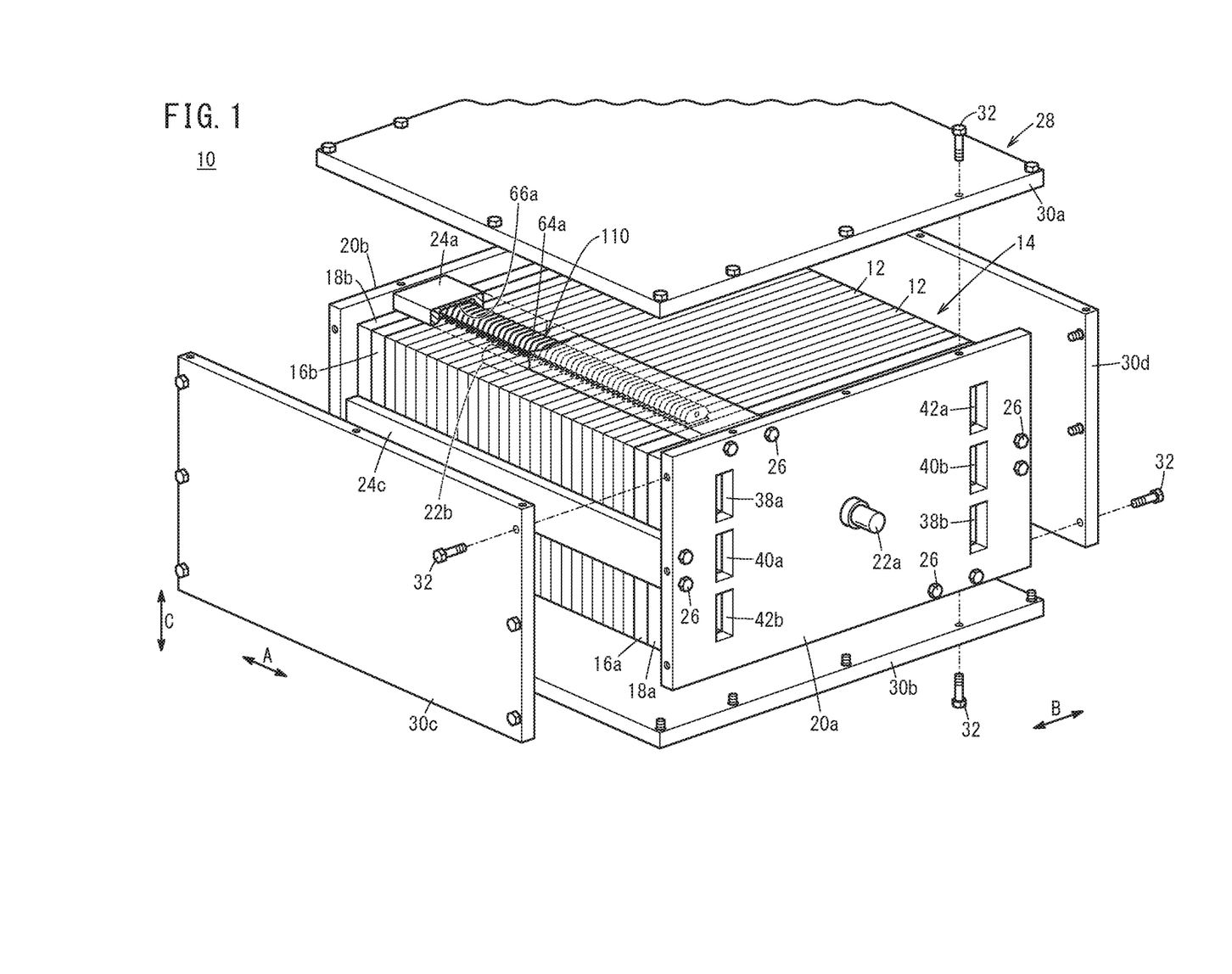
FIG. 1 is a partially exploded perspective view of a fuel cell stack including a fuel cell separator member according to an embodiment of the present invention.

As shown in FIG. 1, a fuel cell stack 10 according to an embodiment includes a stack body 14 formed of a stack of a plurality of unit cells 12. The fuel cell stack 10 is mounted in a fuel cell vehicle such that the stacking direction of the unit cells 12 (the direction of arrow A) coincides with the lateral direction of the fuel cell vehicle (the vehicle width direction or the vehicle length direction), for example. However, the fuel cell stack 10 may be mounted in a fuel cell vehicle such that the stacking direction of the unit cells 12 coincides with the vertical direction of the fuel cell vehicle (the vehicle height direction).

At one end of the stack body 14 in the stacking direction (the direction of arrow A), a terminal plate 16a, an insulating plate 18a, and an end plate 20a are disposed toward the outer side in this order. At the other end of the stack body 14 in the stacking direction, a terminal plate 16b, an insulating plate 18b, and an end plate 20b are disposed toward the outer side in this order.

That is, a set of end plates 20a, 20b are positioned at both ends of the unit cells 12 in the stacking direction. From a central part of the end plate 20a, an output terminal 22a connected with the terminal plate 16a extends. From a central part of the end plate 20b, an output terminal 22b connected with the terminal plate 16b extends.

Figure 2:
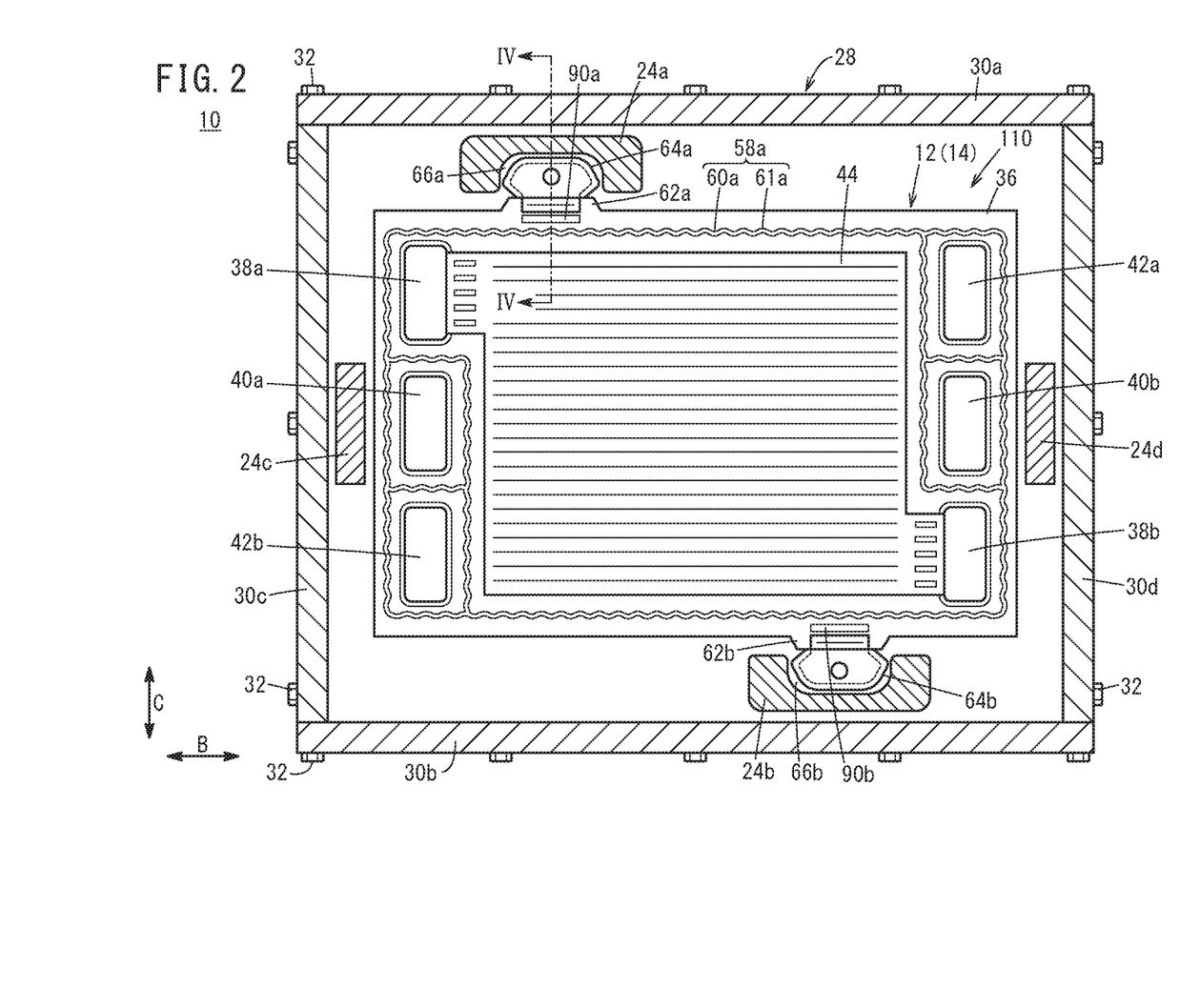
FIG. 2 is a schematic lateral cross-sectional view of the fuel cell stack of FIG. 1.

The end plates 20a, 20b have a shape of a laterally elongated rectangular shape. As shown in FIGS. 1 and 2, coupling members 24a to 24d (coupling bars) are disposed at intermediate portions of respective sides of the end plates 20a, 20b. Both ends of each of the coupling members 24a to 24d are fixed to inner surfaces of the end plates 20a, 20b by bolts 26 (see FIG. 1). This causes the coupling members 24a to 24d to apply a tightening load in the stacking direction (the direction of arrow A) to the stack body 14.

The coupling member 24a is shifted to one end side from the center of one of the longer sides of the end plates 20a, 20b. The coupling member 24b is shifted to the other end side from the center of the other longer sides of the end plates 20a, 20b. The coupling members 24c, 24d are positioned at the center of each of the shorter sides of the end plates 20a, 20b.

The fuel cell stack 10 has a cover 28 that covers the stack body 14 from the direction orthogonal to the stacking direction. The cover 28 includes a set of side panels 30a, 30b in the form of a laterally elongated plate, forming the two surfaces at the both ends in the lateral direction (the direction of arrow C) of the end plates 20a, 20b, and a set of side panels 30c, 30d in the form of a laterally elongated plate, forming the two surfaces at the both ends in the longitudinal direction of the end plates 20a, 20b (the direction of arrow B). The side panels 30a to 30d are fixed to the sides of the end plates 20a, 20b by bolts 32. The cover 28 may be used as necessary and may be dispensed with. The side panels 30a to 30d as the cover 28 may be formed as a one-piece casting or extrusion.

Figure 3:
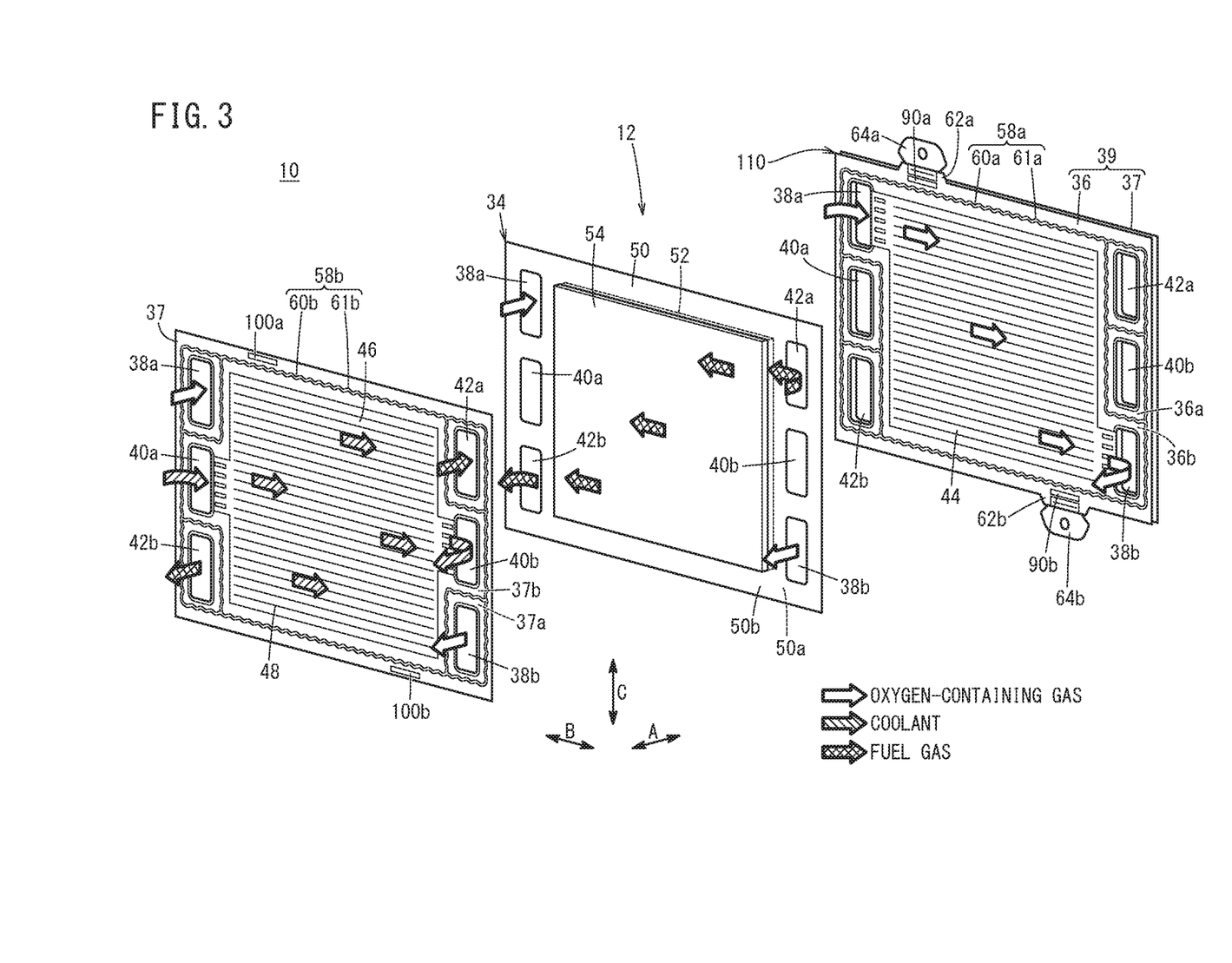
FIG. 3 is an exploded perspective view of key components of a unit cell constituting the fuel cell stack of FIG. 1.
Figure 4:
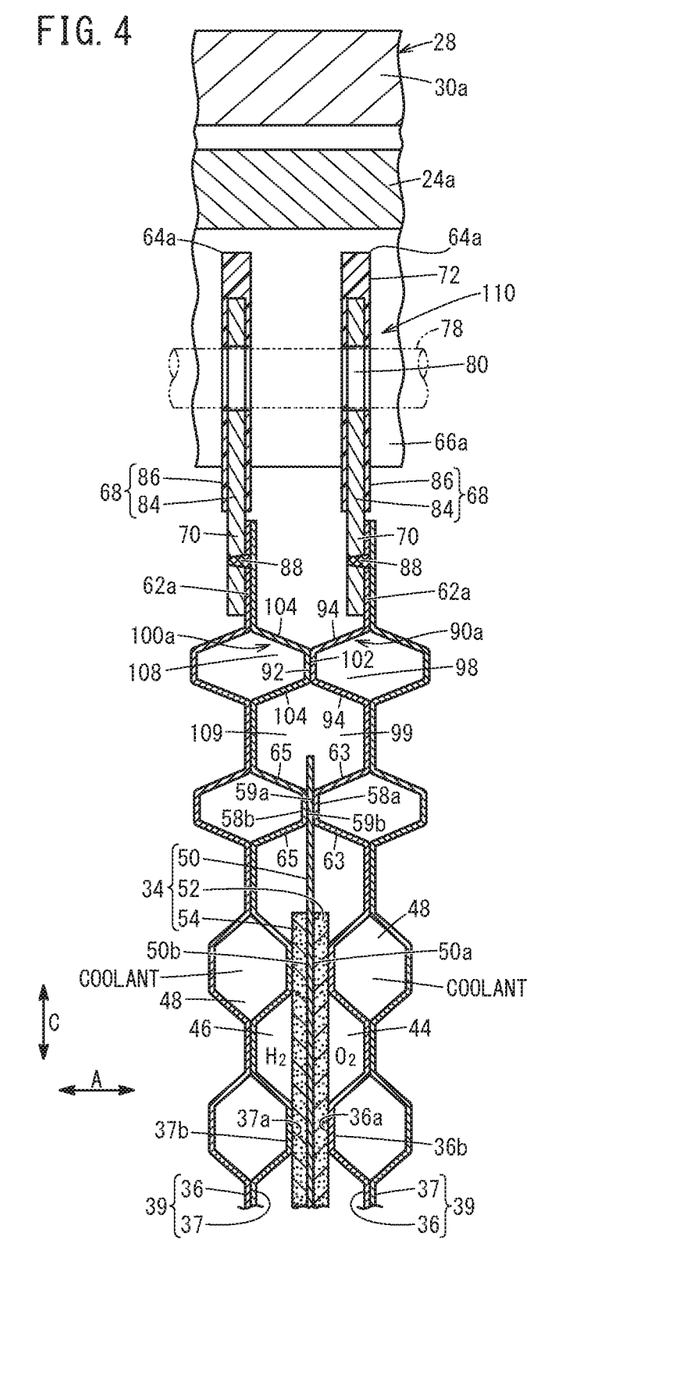
FIG. 4 is a partial cross-sectional view taken along line IV-IV in FIG. 2.

As shown in FIGS. 3 and 4, each unit cell 12 includes an MEA 34 (membrane electrode assembly), and a first separator 36 and a second separator 37 sandwiching the MEA 34.

In FIG. 3, in one end of the unit cell 12 in the direction of arrow B, or the longer side direction, an oxygen-containing gas supply passage 38a, a coolant supply passage 40a, and a fuel gas discharge passage 42b are formed in array in the direction of arrow C (the vertical direction). The oxygen-containing gas supply passages 38a of the respective unit cells 12 are in communication with each other in the stacking direction of the unit cells 12 (the direction of arrow A) and supply an oxygen-containing gas. The coolant supply passages 40a of the respective unit cells 12 are in communication with each other in the direction of arrow A and supply a coolant. The fuel gas discharge passages 42b of the respective unit cells 12 are in communication with each other in the direction of arrow A and discharge a fuel gas, for example, a hydrogen-containing gas.

In the other end of the unit cell 12 in the direction of arrow B, a fuel gas supply passage 42a, a coolant discharge passage 40b, and an oxygen-containing gas discharge passage 38b are formed in array in the direction of arrow C. The fuel gas supply passages 42a of the respective unit cells 12 are in communication with each other in the direction of arrow A and supply fuel gas. The coolant discharge passages 40b of the respective unit cells 12 are in communication with each other in the direction of arrow A and discharge the coolant. The oxygen-containing gas discharge passages 38b of the respective unit cells 12 are in communication with each other in the direction of arrow A and discharge the oxygen-containing gas.

The oxygen-containing gas supply passage 38a and the oxygen-containing gas discharge passage 38b, the fuel gas supply passage 42a and the fuel gas discharge passage 42b, and the coolant supply passage 40a and the coolant discharge passage 40b are also formed in the end plate 20a (see FIG. 1).

The positioning and shapes of the oxygen-containing gas supply passage 38a and the oxygen-containing gas discharge passage 38b, the fuel gas supply passage 42a and the fuel gas discharge passage 42b, and the coolant supply passage 40a and the coolant discharge passage 40b are not limited to those of this embodiment. They may be configured as appropriate to meet required specifications.

As shown in FIGS. 3 and 4, in a surface 36a of the first separator 36 facing the MEA 34, an oxygen-containing gas flow field 44 in communication with the oxygen-containing gas supply passage 38a and the oxygen-containing gas discharge passage 38b is formed. The oxygen-containing gas flow field 44 has a plurality of oxygen-containing gas flow grooves extending in the direction of arrow B.

In a surface 37a of the second separator 37 facing the MEA 34, a fuel gas flow field 46 in communication with the fuel gas supply passage 42a and the fuel gas discharge passage 42b is formed. The fuel gas flow field 46 has a plurality of fuel gas flow grooves extending in the direction of arrow A.

The first separator 36 and the second separator 37 together form a coolant flow field 48 between their opposing surfaces 36b, 37b. The coolant flow field 48 has a plurality of coolant flow grooves extending in the direction of arrow B.

For example, the MEA 34 includes a solid polymer electrolyte membrane 50 (cation exchange membrane), which is a thin film of perfluorosulfonic acid impregnated with water, and a cathode 52 and an anode 54 sandwiching the solid polymer electrolyte membrane 50.

A fluorine based electrolyte may be used as the solid polymer electrolyte membrane 50. Alternatively, an HC (hydrocarbon) based electrolyte may be used. The surface size (outer size) of the solid polymer electrolyte membrane 50 is larger than the surface size (outer size) of the cathode 52 and the surface size (outer size) of the anode 54. That is, the solid polymer electrolyte membrane 50 protrudes outward beyond the cathode 52 and the anode 54. The portion of the solid polymer electrolyte membrane 50 that protrudes to the outer peripheral portion side may be formed of a frame-shaped film impermeable to the reactant gas. The inner peripheral portion of the film is in contact with the outer peripheral portions of the cathode 52 and the anode 54.

The cathode 52 is joined to a surface 50a of the solid polymer electrolyte membrane 50. The anode 54 is joined to a surface 50b of the solid polymer electrolyte membrane 50. Each of the cathode 52 and the anode 54 includes an electrode catalyst layer and a gas diffusion layer. For example, the electrode catalyst layer includes platinum alloy supported on porous carbon particles, and the carbon particles are deposited uniformly on the surface of the gas diffusion layer. The gas diffusion layer comprises a carbon paper, carbon cloth, and the like.

The MEA 34 may also be configured such that the surface size of the solid polymer electrolyte membrane 50 is smaller than the surface size of the cathode 52 and the surface size of the anode 54, and a frame shaped resin film (resin frame member) is sandwiched between an outer marginal portion of the cathode 52 and an outer marginal portion of the anode 54. In that case, the MEA 34 may be a so-called a stepped MEA, in which the surface size of the anode 54 is set to be smaller than the surface size of the solid polymer electrolyte membrane 50 and the surface size of the cathode 52 is set to be the same as the surface size of the solid polymer electrolyte membrane 50. However, the MEA 34 may be such that the surface size of the anode 54 is set to be smaller than the surface size of the solid polymer electrolyte membrane 50 and the surface size of the cathode 52 is set to be the same as the surface size of the solid polymer electrolyte membrane 50. Also, the MEA 34 is not limited to a stepped MEA but both of the gas diffusion layers may be set to have the same surface size as each other. The resin film is made impermeable to reactant gas.

The first separator 36 and the second separator 37 are formed in a rectangular (quadrangle) shape. The first separator 36 and the second separator 37 are fabricated by press forming of a metal thin plate to have a corrugated shape in cross section. For example, the metal plate is a steel plate, a stainless steel plate, an aluminum plate, a plated steel plate, or a metal plate with an anti-corrosive surface by surface treatment. The first separator 36 and the second separator 37 are joined together at their outer ends by welding, blazing, crimping, or the like with the surface 36b and the surface 37b facing and in contact with each other to form a joint separator 39.

Figure 5A:
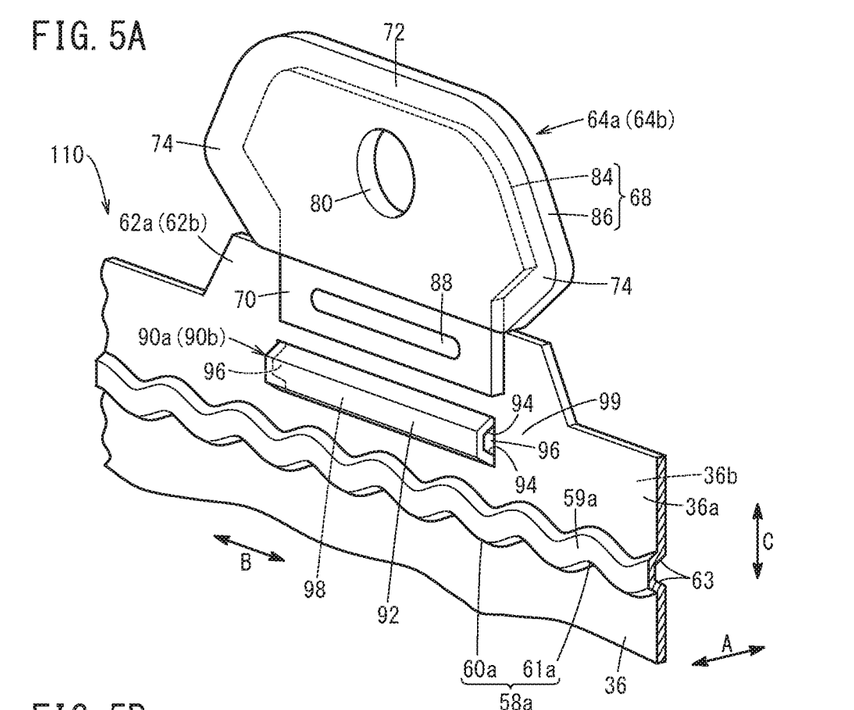
FIG. 5A is a partial perspective view showing a first rib and a load receiving portion and FIG. 5B is a partial perspective view showing a second rib.

As shown in FIGS. 4 and 5A, a first seal line 58a (sealing portion) is formed integrally with the first separator 36 so as to be expanded toward the MEA 34. A first sealing surface 59a, which is the protruding end surface of the first seal line 58a, is a flat surface to make air-tight contact with the surface 50a of the solid polymer electrolyte membrane 50 (see FIG. 4). However, the protruding end surface of the first seal line 58a may be of a rounded shape.

The first seal line 58a is formed around the outer peripheral portion of the first separator 36, thereby preventing leakage of fluid (fuel gas, oxygen-containing gas, and coolant) to the outside from between the first separator 36 and the MEA 34. That is, the first seal line 58a is embodied as a metal bead seal that provides sealing by the first sealing surface 59a thereof elastically deforming in direct contact (close contact) with the surface 50a of the solid polymer electrolyte membrane 50 or a resin film provided at its outer peripheral portion.

A resin material with elasticity may be provided on the protruding end surface of the first seal line 58a, which is a metal bead seal. In that case, the first sealing surface 59a is provided on the resin material. Also, the first seal line 58a may be formed of a rubber seal member with elasticity.

In FIGS. 3 and 5A, the first seal line 58a extends in a wavy shape in a plan view of the first separator 36. The period and amplitude of the waves of the first seal line 58a may be set as appropriate so as to provide good sealing properties. That is, the first seal line 58a has an alternating arrangement of a first concave curved portion 60a and a first convex curved portion 61a. The first concave curved portion 60a is curved such that it is recessed with respect to the outer edge of the first separator 36. The first convex curved portion 61a is curved such that it protrudes toward the outer edge of the first separator 36. The first seal line 58a may extend in a straight line, however.

A side wall 63 of the first seal line 58a is inclined relative to the thickness direction of the first separator 36 (the direction of arrow A, or the stacking direction). Accordingly, the cross section of the first seal line 58a along the thickness direction of the first separator 36 is formed in a trapezoidal shape. The side wall 63 of the first seal line 58a may also be parallel to the thickness direction of the first separator 36. That is, the first seal line 58a may be formed such that its cross section along the thickness direction of the first separator 36 is of a rectangular shape.

Figure 5B:
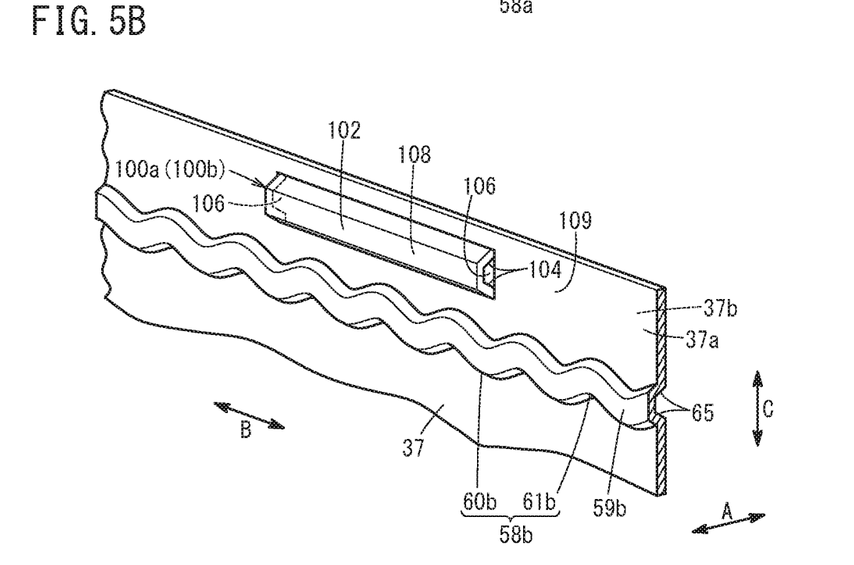

As shown in FIGS. 4 and 5B, a second seal line 58b is formed integrally with the second separator 37 so as to be expanded toward the MEA 34. A second sealing surface 59b, which is the protruding end surface of the second seal line 58b, is a flat surface to make air-tight contact with the surface 50b of the solid polymer electrolyte membrane 50 (see FIG. 4). However, the second sealing surface 59b of the second seal line 58b may be expanded in a rounded shape.

The second seal line 58b is provided around the outer peripheral portion of the second separator 37, thereby preventing leakage of fluid (fuel gas, oxygen-containing gas, and coolant) from between the second separator 37 and the MEA 34. That is, the second seal line 58b is embodied as a metal bead seal that provides sealing by the second sealing surface 59b thereof elastically deforming in direct contact (close contact) with the surface 50b of the solid polymer electrolyte membrane 50 or a resin film provided at its outer peripheral portion.

A resin material with elasticity may be provided on the protruding end surface of the second seal line 58b, which is a metal bead seal. In that case, the second sealing surface 59b is provided on the resin material. Also, the second seal line 58b may be formed of a rubber seal member with elasticity.

As shown in FIGS. 3 and 5B, the second seal line 58b extends in a wavy shape in a plan view of the second separator 37. The period and amplitude of the waves of the second seal line 58b may be set as appropriate so as to provide good sealing properties. That is, the second seal line 58b has an alternating arrangement of a second concave curved portion 60b and a second convex curved portion 61b. The second concave curved portion 60b is curved such that it is recessed with respect to the outer edge of the second separator 37. The second convex curved portion 61b is curved such that it protrudes toward the outer edge of the second separator 37. The second seal line 58b may extend in a straight line, however.

A side wall 65 of the second seal line 58b is inclined relative to the thickness direction of the second separator 37. Accordingly, the cross section of the second seal line 58b along the thickness direction of the second separator 37 is formed in a trapezoidal shape. The side wall 65 of the second seal line 58b may also be parallel to the thickness direction of the second separator 37. That is, the second seal line 58b may be formed such that its cross section along the thickness direction of the second separator 37 is of a rectangular shape.

As shown in FIGS. 2 and 3, a supporting portion 62a protruding outwardly (in the direction of arrow C) is formed on one of the longer sides of the first separator 36. The supporting portion 62a is shifted to one end side from the center of one of the longer sides of the first separator 36 so as to face the coupling member 24a (see FIG. 2). The supporting portion 62a is provided integrally with the first separator 36 by press forming. However, the supporting portion 62a may be joined to the first separator 36.

As shown in FIGS. 2 to 5A, the supporting portion 62a is provided with a load receiving portion 64a in a form of a plate for receiving an external load (impact load) in the direction orthogonal to the stacking direction of the unit cells 12 (the direction of arrow B). In FIGS. 4 and 5A, the load receiving portion 64a has a protrusion 68 protruding outwardly from the supporting portion 62a in the direction of arrow C, and an attachment portion 70 provided integrally with the protrusion 68 and joined with the supporting portion 62a.

The protrusion 68 of the load receiving portion 64a is inserted in a recess 66a formed in the coupling member 24a (see FIG. 2). The protrusion 68 has a protrusion body 72 located in the center in the width direction of the protrusion 68 (the direction of arrow B) and a set of expanded portions 74 expanded from both ends of the protrusion body 72 in the width direction toward both sides in the width direction, respectively.

In FIG. 4, a positioning hole 80 is formed in the center of the protrusion body 72 for insertion of a rod 78 used for positioning the unit cells 12 at the time of the manufacture of the fuel cell stack 10. The rod 78 may be removed from the positioning hole 80 after the positioning of the unit cells 12 is completed or may be left in the positioning hole 80.

As shown in FIGS. 4 and 5A, the protrusion 68 has a base portion 84 forming its outer shape and an insulating portion 86 covering the outer surface of the base portion 84. The base portion 84 and the attachment portion 70 are integrally formed by press forming of a single metal plate. The material to form the base portion 84 and the attachment portion 70 may be similar to the material of the first separator 36 and the second separator 37. The insulating portion 86 blocks the electrical connection between the base portion 84 and the coupling member 24a.

The attachment portion 70 is formed in a substantially rectangular shape and extends in the direction of arrow B. The attachment portion 70 is located in the center of the supporting portion 62a in the direction of arrow B. The attachment portion 70 is joined with the supporting portion 62a by welding, blazing, or the like while it is laid on the face of the supporting portion 62a (the surface 36a of the first separator 36). A joint portion 88 (welding bead) that joins the attachment portion 70 and the supporting portion 62a together extends along the length direction of the attachment portion 70 (the direction of arrow B).

As shown in FIGS. 2 and 3, a supporting portion 62b is formed on the other longer side of the first separator 36 so as to protrude outwardly (in the direction of arrow C). The supporting portion 62b is shifted from the center of the other longer side of the first separator 36 to the other end side so as to face the coupling member 24b (see FIG. 2). The supporting portion 62b is provided integrally with the first separator 36 by press forming. However, the supporting portion 62b may be joined to the first separator 36.

In FIGS. 2 to 5A, the supporting portion 62b has a plate-shaped load receiving portion 64b for receiving an external load (impact load) in the direction orthogonal to the stacking direction of the unit cells 12 (the direction of arrow B). The load receiving portion 64b is configured similarly to the load receiving portion 64a described above. In other words, the load receiving portion 64b has a vertically inverted shape of the load receiving portion 64a. Thus, the detailed configuration of the load receiving portion 64b is not described here. The protrusion 68 of the load receiving portion 64b is inserted in a recess 66b formed in the coupling member 24b (see FIG. 2).

On the first separator 36, first ribs 90a, 90b for increasing the rigidity of the supporting portion 62a are formed. As shown in FIGS. 4 and 5A, the first rib 90a protrudes from the first separator 36 at a portion between the load receiving portion 64a and the first seal line 58a toward the second separator 37 (the opposite separator) located on the opposite side of the first separator 36 across the MEA 34. The first rib 90a is press-formed integrally with the first separator 36.

The first rib 90a extends in a straight line along the extending direction of the first seal line 58a (the direction of arrow B). However, the first rib 90a may also extend in a wavy shape. The first rib 90a extends in the direction of arrow B along the attachment portion 70 of the load receiving portion 64a over a substantially same length as the attachment portion 70. A protruding end surface 92 of the first rib 90a is a flat surface. However, the protruding end surface 92 of the first rib 90a may also be expanded in a rounded shape. The protruding length of the first rib 90a is substantially the same as the protruding length of the first seal line 58a (the length along the thickness direction of the first separator 36).

A side wall 94 of the first rib 90a is inclined relative to the thickness direction of the first separator 36 (the direction of arrow A, or the stacking direction). Accordingly, the cross section of the first rib 90a along the thickness direction of the first separator 36 is formed in a trapezoidal shape. The first rib 90a elastically deforms when a tightening load is applied in the stacking direction. The side wall 94 of the first rib 90a may also be parallel to the thickness direction of the first separator 36. That is, the first rib 90a may be formed such that its cross section along the thickness direction of the first separator 36 is of a rectangular shape.

In FIG. 5A, openings 96 which are open in the extending direction of the first rib 90a are formed at both ends of the first rib 90a. The opening 96 may also be formed only at one end of the first rib 90a. That is, an inner space 98, which is of the reverse concave shape of the first rib 90a, is in communication via the openings 96 with a space 99 on the side of the surface 36a of the first separator 36 facing the MEA 34. In this case, as the space 99 is located outside the first seal line 58a, reactant gas will not flow to the outside. The shorter sides defining both ends of the first rib 90a extend in a straight line along the direction of arrow C. Each end of the first rib 90a in the extending direction is located opposite the first concave curved portion 60a of the first seal line 58a.

The first rib 90b protrudes from a portion between the load receiving portion 64b and the first seal line 58a toward the second separator 37 located on the opposite side of the first separator 36 across the MEA 34. The first rib 90b extends in the direction of arrow B along the attachment portion 70 of the load receiving portion 64b over a substantially same length as the attachment portion 70. The first rib 90b is configured similarly to the first rib 90a described above. Thus, the configuration of the first rib 90b is not described here.

In this embodiment, a fuel cell separator member (hereinafter referred to as "separator member 110") is constructed by joining the load receiving portion 64a with the supporting portion 62a of the first separator 36 and joining the load receiving portion 64b with the supporting portion 62b of the first separator 36.

As shown in FIGS. 3, 4, and 5B, two second ribs 100a, 100b are formed on the second separator 37 so as to face the first ribs 90a, 90b. As shown in FIGS. 4 and 5B, the second rib 100a protrudes from the second separator 37 at a portion on the outer peripheral portion side relative to the second seal line 58b toward the first separator 36 (the first ribs 90a, 90b), which is located on the opposite side of the second separator 37 across the MEA 34. The second rib 100a is press-formed integrally with the second separator 37.

The second rib 100a extends in a straight line along the extending direction of the second seal line 58b (the direction of arrow B). However, the second rib 100a may also extend in a wavy shape. The total length of the second rib 100a is substantially the same as that of the first rib 90a. A protruding end surface 102 of the second rib 100a is a flat surface. However, the protruding end surface 102 of the second rib 100a may also be expanded in a rounded shape. The protruding length of the second rib 100a is substantially the same as the protruding length of the second seal line 58b (the length along the thickness direction of the second separator 37). The protruding end surface 102 of the second rib 100a abuts against the protruding end surface 92 of the first rib 90a.

A side wall 104 of the second rib 100a is inclined relative to the thickness direction of the second separator 37 (the direction of arrow A, or the stacking direction). Accordingly, the cross section of the second rib 100a along the thickness direction of the second separator 37 is formed in a trapezoidal shape. The second rib 100a elastically deforms when a tightening load is applied in the stacking direction. The side wall 104 of the second rib 100a may also be parallel to the thickness direction of the second separator 37. That is, the second rib 100a may be formed such that its cross section along the thickness direction of the second separator 37 is of a rectangular shape.

In FIG. 5B, openings 106 which are open in the extending direction of the second rib 100a are formed at both ends of the second rib 100a. The opening 106 may also be formed only at one end of the second rib 100a. That is, an inner space 108, which is of the reverse concave shape of the second rib 100a, is in communication via the openings 106 with a space 109 on the side of the surface 37a of the second separator 37 facing the MEA 34. In this case, as the space 109 is located outside the second seal line 58b, reactant gas will not flow to the outside. The shorter sides defining both ends of the second rib 100a extend in a straight line along the direction of arrow C. Each end of the second rib 100a in the extending direction is located opposite the second concave curved portion 60b of the second seal line 58b.

The second rib 100b is configured similarly to the second rib 100a described above. Thus, the configuration of the second rib 100b is not described here.

Next, the operation of the fuel cell stack 10 configured as discussed above is described.

First, as shown in FIG. 1, oxygen-containing gas such as air is supplied to the oxygen-containing gas supply passage 38a of the end plate 20a. Fuel gas such as hydrogen-containing gas is supplied to the fuel gas supply passage 42a of the end plate 20a. A coolant such as pure water, ethylene glycol, or oil is supplied to the coolant supply passage 40a of the end plate 20a.

The oxygen-containing gas is introduced into the oxygen-containing gas flow field 44 of the first separator 36 from the oxygen-containing gas supply passage 38a as shown in FIG. 3. The oxygen-containing gas moves in the direction of arrow B along the oxygen-containing gas flow field 44 to be supplied to the cathode 52 of the membrane electrode assembly.

Meanwhile, the fuel gas is introduced into the fuel gas flow field 46 of the second separator 37 from the fuel gas supply passage 42a. The fuel gas moves in the direction of arrow B along the fuel gas flow field 46 to be supplied to the anode 54 of the membrane electrode assembly.

Consequently, in each MEA 34, the oxygen-containing gas supplied to the cathode 52 and the fuel gas supplied to the anode 54 are partially consumed by electrochemical reaction to generate electric power.

Then, the oxygen-containing gas after being supplied to the cathode 52 and partially consumed is discharged in the direction of arrow A along the oxygen-containing gas discharge passage 38b. Similarly, the fuel gas after being supplied to the anode 54 and partially consumed is discharged in the direction of arrow A along the fuel gas discharge passage 42b.

The coolant supplied to the coolant supply passage 40a is introduced into the coolant flow field 48 formed between the first separator 36 and the second separator 37 and then flows in the direction of arrow B. The coolant cools the MEA 34, after which it is discharged from the coolant discharge passage 40b.

In this embodiment, when an impact load in the direction of arrow B is externally applied to the fuel cell stack 10, the load receiving portion 64a comes into contact with the wall surface that defines the recess 66a of the coupling member 24a and the load receiving portion 64b comes into contact with the wall surface that defines the recess 66b of the coupling member 24b. This restrains the dislocation of the unit cells 12 in the direction of arrow B.

The separator member 110 and the fuel cell stack 10 according to this embodiment have the following effects.

The first rib 90a, 90b protrudes from the first separator 36 at a portion between the first seal line 58a and the load receiving portion 64a, 64b toward the second separator 37 (the opposite separator) located on the opposite side of the first separator 36 across the MEA 34, and extends in a line along the extending direction of the first seal line 58a. The openings 96 are formed at both ends of the first rib 90a, 90b in the extending direction thereof.

Thus, the rigidity of the supporting portions 62a, 62b of the first separator 36 in which the load receiving portions 64a, 64b are provided can be increased with the first ribs 90a, 90b.

In addition, due to the formation of the openings 96 at both ends of the first rib 90a, 90b in the extending direction thereof, the rigidity at the ends of the first rib 90a, 90b in the extending direction can be reasonably reduced. Accordingly, when the separator member 110 is incorporated into the fuel cell stack 10 and a tightening load is applied in the stacking direction, the ends of the first rib 90a, 90b in the extending direction can be bent effectively. This can suppress reduction in the bearing pressure on the first seal line 58a at spots near the ends of the first rib 90a, 90b in the extending direction. Thus, variations in the bearing pressure on the first seal line 58a can be suppressed.

The first seal line 58a extends in a wavy shape in a plan view of the first separator 36. Each end of the first rib 90a, 90b in the extending direction thereof is located opposite the first concave curved portion 60a of the first seal line 58a, which is curved such that it is recessed with respect to the outer edge of the first separator 36.

This can make the distance of separation between each end of the first rib 90a, 90b in the extending direction and the first seal line 58a relatively long. Thus, reduction in the bearing pressure in the first concave curved portions 60a of the first seal line 58a near the ends of the first rib 90a, 90b can be effectively suppressed.

The protruding length of the first rib 90a, 90b is substantially the same as the length of the first seal line 58a along the thickness direction of the first separator 36 (the protruding length of the first seal line 58a). This can effectively increase the rigidity of the supporting portions 62a, 62b and suppress variations in the bearing pressure on the first seal line 58a. The protruding end surfaces 92 of the first ribs 90a, 90b and the protruding end surfaces 102 of the second ribs 100a, 100b abut each other, respectively. This can increase the rigidity of the first ribs 90a, 90b and the second ribs 100a, 100b.

The present invention is not limited to the arrangements described above. The fuel cell stack 10 may alternatively include a separator member 110a according to a first variation shown in FIG. 6A. With regard to the separator member 110a according to the first variation, the same components as ones of the separator member 110 described above are denoted with the same reference characters and they are not described in detail again. This also applies to a separator member 110b according to a second variation discussed below.

Figure 6A:
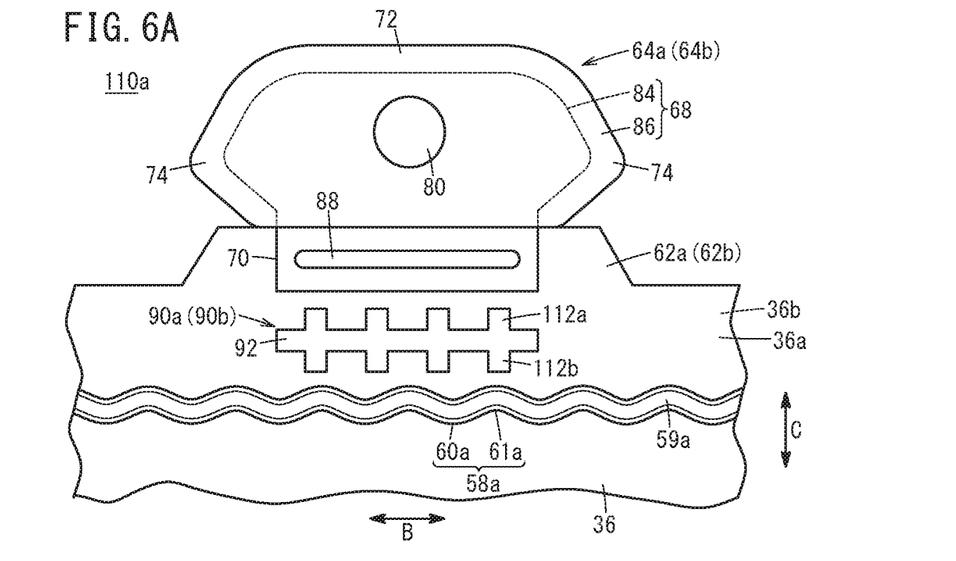
FIG. 6A is a partial plan view of a separator member according to a first variation and FIG. 6B is a partial plan view of a separator member according to a second variation.

As shown in FIG. 6A, the first separator 36 constituting the separator member 110a is provided with a plurality of first reinforcing ribs 112a protruding from the first rib 90a to the side on which the load receiving portion 64a is located, and a plurality of second reinforcing ribs 112b protruding from the first rib 90a to the side on which the first seal line 58a is located. At both ends of the first rib 90a, openings 96 being open in the extending direction of the first rib 90a (see FIG. 5A) are formed.

That is, the first reinforcing ribs 112a and the second reinforcing ribs 112b extend from the first rib 90a in a direction that crosses (a direction orthogonal to) the extending direction of the first rib 90a. The plurality of first reinforcing ribs 112a are provided at equal intervals in the extending direction of the first rib 90a. The protruding length of the first reinforcing ribs 112a (the length along the thickness direction of the first separator 36) is substantially the same as the protruding length of the first rib 90a.

The plurality of second reinforcing ribs 112b are provided at equal intervals in the extending direction of the first rib 90a. The protruding length of the second reinforcing ribs 112b (the length along the thickness direction of the first separator 36) is substantially the same as the protruding length of the first rib 90a.

Each first reinforcing rib 112a and each second reinforcing rib 112b extend from the same position in the extending direction the first rib 90a to both sides. In other words, the first reinforcing ribs 112a and the second reinforcing ribs 112b are aligned in the direction of arrow C. The first reinforcing ribs 112a and the second reinforcing ribs 112b are not provided at the ends of the first rib 90a.

The first reinforcing ribs 112a and the second reinforcing ribs 112b are provided on the first rib 90b as with the first rib 90a. In this case, at both ends of the first rib 90b, openings 96 being open in the extending direction of the first rib 90b (see FIG. 5A) are formed. The first reinforcing ribs 112a and the second reinforcing ribs 112b may be provided on the second ribs 100a, 100b of the second separator 37. In this case, at both ends of the second rib 100a, 100b, openings 106 being open in the extending direction of the second rib 100a, 100b (see FIG. 5B) are formed.

Such arrangements can increase the rigidity of the supporting portions 62a, 62b of the first separator 36 further effectively with the first reinforcing ribs 112a and the second reinforcing ribs 112b.

Figure 6B:
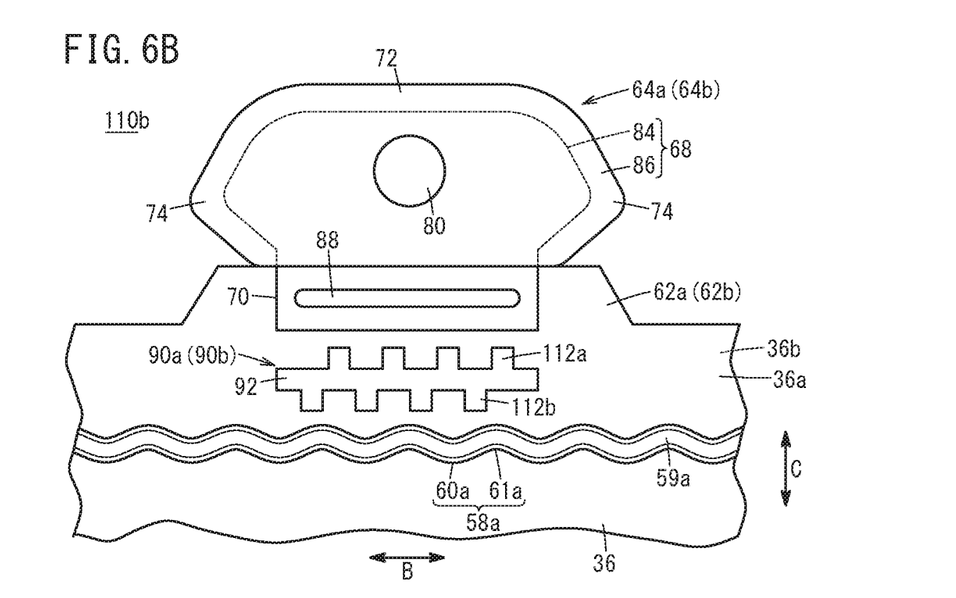

The fuel cell stack 10 may also include the separator member 110b according to the second variation shown in FIG. 6B. As shown in FIG. 6B, the first separator 36 constituting the separator member 110b is provided with the first reinforcing ribs 112a and the second reinforcing ribs 112b described above.

The first reinforcing ribs 112a and the second reinforcing ribs 112b in this variation are positioned alternatingly (staggered) in the extending direction of the first rib 90a. At both ends of the first rib 90a, openings 96 being open in the extending direction of the first rib 90a (see FIG. 5A) are formed. That is, each second reinforcing rib 112b extends from the first rib 90a between portions where neighboring first reinforcing ribs 112a extend. Such a separator member 110b provides similar effects to those of the separator member 110a described above.

The first reinforcing ribs 112a and the second reinforcing ribs 112b shown in FIG. 6B may also be provided on the first rib 90b as with the first rib 90a. In this case, at both ends of the first rib 90b, openings 96 being open in the extending direction of the first rib 90b (see FIG. 5A) are formed. Also, the first reinforcing ribs 112a and the second reinforcing ribs 112b shown in FIG. 6B may be provided on the second ribs 100a, 100b of the second separator 37. In this case, at both ends of the second rib 100a, 100b, openings 106 being open in the extending direction of the second rib 100a, 100b (see FIG. 5B) are formed.

The load receiving portions 64a, 64b may be located in the center of the respective longer sides of the first separator 36. Also, two or more load receiving portions 64a, 64b may be provided on each longer side or shorter side of the first separator 36. The load receiving portions 64a, 64b may also be provided on both the first separator 36 and the second separator 37.

It will be appreciated that the fuel cell separator member and the fuel cell stack according to the present invention are not limited to the above embodiments but may employ various other arrangements without departing from the gist of the present invention.

What is claimed is:

1. A fuel cell separator member comprising:
   a separator forming a unit cell of a fuel cell stack and a plate-shaped load receiving portion provided on the separator so as to protrude outwardly from an outer peripheral portion of the separator, the unit cell including an opposite separator located on an opposite side of the separator across a membrane electrode assembly,
   wherein the separator includes:
   a sealing portion provided around the outer peripheral portion of the separator and making close contact with the membrane electrode assembly to prevent leakage of fluid from between the membrane electrode assembly and the separator;
   a rib protruding from the separator at a portion between the sealing portion and the load receiving portion toward the opposite separator and extending in a line along an extending direction of the sealing portion; and
   a reinforcing rib extending from the rib in a direction that crosses an extending direction of the rib, and
   an opening is formed in at least one end of the rib in the extending direction thereof.

2. The fuel cell separator member according to claim 1, wherein the sealing portion extends in a wavy shape in a plan view of the separator, and
   each end of the rib in the extending direction thereof is located opposite a concave curved portion of the sealing portion, the concave curved portion being curved such that it is recessed with respect to an outer edge of the separator.

3. The fuel cell separator member according to claim 1, wherein a protruding length of the rib is same as a length of the sealing portion along a thickness direction of the separator.

4. The fuel cell separator member according to claim 1, wherein the rib extends along an attachment portion of the load receiving portion to be attached to the separator, over a substantially same length as the attachment portion.

5. The fuel cell separator member according to claim 1, wherein the protruding length of the reinforcing rib along the thickness direction of the separator is substantially same as the protruding length of the rib.

6. The fuel cell separator member according to claim 1, wherein a plurality of the reinforcing ribs are provided at equal intervals along the extending direction of the rib.

7. A fuel cell stack comprising a plurality of stacked unit cells each having a fuel cell separator member, the fuel cell separator member including a separator forming the unit cell and a plate-shaped load receiving portion provided on the separator so as to protrude outwardly from an outer peripheral portion of the separator, the unit cell including an opposite separator located on an opposite side of the separator across a membrane electrode assembly,
   wherein the separator includes:
   a sealing portion provided around the outer peripheral portion of the separator and making close contact with the membrane electrode assembly to prevent leakage of fluid from between the membrane electrode assembly and the separator;
   a rib protruding from the separator at a portion between the sealing portion and the load receiving portion toward the opposite separator and extending in a line along an extending direction of the sealing portion;
   a reinforcing rib extending from the rib in a direction that crosses an extending direction of the rib, and
   an opening is formed in at least one end of the rib in the extending direction thereof.

8. The fuel cell stack according to claim 7, wherein the unit cell includes a joined separator made of a first separator as the separator and a second separator joined together, and
   the load receiving portion is not provided on the second separator.

9. The fuel cell stack according to claim 7, wherein the sealing portion extends in a wavy shape in a plan view of the separator, and
   each end of the rib in the extending direction thereof is located opposite a concave curved portion of the sealing portion, the concave curved portion being curved such that it is recessed with respect to an outer edge of the separator.

10. The fuel cell stack according to claim 7, wherein a protruding length of the rib is same as a length of the sealing portion along a thickness direction of the separator.

11. The fuel cell stack according to claim 7, wherein the rib extends along an attachment portion of the load receiving portion to be attached to the separator, over a substantially same length as the attachment portion.

12. The fuel cell stack according to claim 7, wherein the protruding length of the reinforcing rib along the thickness direction of the separator is substantially same as the protruding length of the rib.

13. The fuel cell stack according to claim 7, wherein a plurality of the reinforcing ribs are provided at equal intervals along the extending direction of the rib.

* * * * *